(12) United States Patent
Matsushima et al.

(10) Patent No.: US 8,292,323 B2
(45) Date of Patent: Oct. 23, 2012

(54) KNEE AIRBAG DEVICE FOR VEHICLE

(75) Inventors: Hitoshi Matsushima, Aichi (JP);
Osamu Fukawatase, Aichi (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 77 days.

(21) Appl. No.: 13/057,509

(22) PCT Filed: Jul. 24, 2009

(86) PCT No.: PCT/JP2009/063257
§ 371 (c)(1),
(2), (4) Date: Feb. 4, 2011

(87) PCT Pub. No.: WO2010/016398
PCT Pub. Date: Feb. 11, 2010

(65) Prior Publication Data
US 2011/0156378 A1    Jun. 30, 2011

(30) Foreign Application Priority Data

Aug. 6, 2008  (JP) ................................ 2008-203262

(51) Int. Cl.
*B60R 21/16* (2006.01)
(52) U.S. Cl. .................. 280/730.1; 280/743.2
(58) Field of Classification Search ............... 280/730.1, 280/732, 743.2
See application file for complete search history.

(56) References Cited

U.S. PATENT DOCUMENTS

| 6,155,595 | A | 12/2000 | Schultz |
| 6,685,217 | B2 | 2/2004 | Abe |
| 6,705,638 | B2 | 3/2004 | Abe et al. |
| 6,752,417 | B2 | 6/2004 | Takimoto et al. |
| 7,147,247 | B2 | 12/2006 | Hayakawa |
| 7,261,318 | B2 | 8/2007 | Enders |
| 7,314,230 | B2 * | 1/2008 | Kumagai et al. ........... 280/730.1 |
| 7,322,599 | B2 * | 1/2008 | Abe et al. .................. 280/730.1 |
| 7,434,837 | B2 * | 10/2008 | Hotta et al. ................. 280/743.2 |
| 8,186,707 | B2 * | 5/2012 | Matsushima et al. ...... 280/730.1 |
| 2005/0062265 | A1 | 3/2005 | Hotta et al. |
| 2005/0189741 | A1 * | 9/2005 | Abe et al. ................... 280/730.1 |

(Continued)

FOREIGN PATENT DOCUMENTS

JP        11-321539        11/1999

(Continued)

OTHER PUBLICATIONS

International Search Report in International Application No. PCT/JP2009/063257; Mailing Date: Aug. 25, 2009.

(Continued)

*Primary Examiner* — Faye M. Fleming

(74) *Attorney, Agent, or Firm* — Finnegan, Henderson, Farabow, Garrett & Dunner, LLP

(57) ABSTRACT

A load on the shins when a knee airbag is deployed by inflating in a state in which the knees of an occupant are proximate to an airbag door or suchlike is moderated. Inside a knee airbag, an upper tether and a lower tether are disposed to sandwich an inflator from above and below. First opening portions and second opening portions for letting gas flow through up and down are alternatingly formed in the upper tether and the lower tether. The second opening portions are formed as circular holes with smaller diameters than the first opening portions. The second opening portions are disposed at positions opposing the knees of a small occupant in a sitting state.

6 Claims, 12 Drawing Sheets

U.S. PATENT DOCUMENTS

| | | | |
|---|---|---|---|
| 2006/0108780 A1 | 5/2006 | Hotta et al. | |
| 2007/0145726 A1 | 6/2007 | Ochiai et al. | |
| 2008/0106078 A1* | 5/2008 | Fukawatase et al. | 280/730.1 |
| 2008/0116669 A1* | 5/2008 | Adachi et al. | 280/730.1 |
| 2009/0230661 A1* | 9/2009 | Fukawatase et al. | 280/730.1 |
| 2010/0295279 A1* | 11/2010 | Fukawatase et al. | 280/730.1 |

FOREIGN PATENT DOCUMENTS

| | | |
|---|---|---|
| JP | 2002-337642 | 11/2002 |
| JP | 2002-356137 | 12/2002 |
| JP | 2003-175793 | 6/2003 |
| JP | 2003-220920 | 8/2003 |
| JP | 2005-96576 | 4/2005 |
| JP | 2005-289257 | 10/2005 |
| JP | 2006-131186 | 5/2006 |
| JP | 2007-161090 | 6/2007 |
| JP | 2007-176353 | 7/2007 |
| JP | 2009-083550 | 4/2009 |
| JP | 2010052457 A * | 3/2010 |

OTHER PUBLICATIONS

Notice of Reasons for Rejection in JP 2008-203262; Mailing Date: Aug. 18, 2009.

Decision of Refusal in JP 2008-203262; Mailing Date: Apr. 20, 2010.

Notice of Reasons for Rejection, JP Patent Application No. 2008-203262, mailed Aug. 18, 2009.

* cited by examiner

KNEE AIRBAG DEVICE FOR VEHICLE

CROSS-REFERENCE TO RELATED APPLICATIONS

This application is a national phase application of International Application No. PCT/JP2009/063257, filed Jul. 24, 2009, and claims the priority of Japanese Application No. 2008-203262, filed Aug. 6, 2008, the contents of both of which are incorporated herein by reference.

TECHNICAL FIELD

The present invention relates to a knee airbag device for a vehicle, which is for protecting the knees of an occupant.

RELATED ART

In recent years, with a view to improving occupant protection performance at times of collisions, the installation in vehicles of vehicle knee airbag devices, which deploy by inflating a knee airbag at the time of a collision and restrain the kneecaps of occupants (hereinafter referred to simply as "the knees"), has been promoted. Within patent references of Japanese Patent Application Laid-Open (JP-A) No. 11-321539, JP-A No. 2002-337642, JP-A No. 2002-356137, JP-A No. 2003-175793, and JP-A No. 2005-096576, JP-A No. 11-321539 disclose an example of this kind of vehicle knee airbag device is disclosed. Briefly described, in the technology disclosed in the document, a knee airbag device for a vehicle is disposed at a passenger seat side of an instrument panel. Dividing walls are provided at two upper and lower levels inside the knee airbag. Thus, the knee airbag is provided with three chambers, an upper chamber, a middle chamber and a lower chamber. An airbag module, including an inflator, is disposed in the middle chamber.

DISCLOSURE OF INVENTION

Subject to be Addressed by the Invention

However, in a case with the above-described technology, the middle chamber deploys by inflating at the height of a vicinity of upper portions (just below the kneecaps) of the shins of an occupant (hereinafter referred to simply as "the upper shin portions"). Therefore, if the occupant is sitting on a vehicle seat in a state in which the knees are close to the airbag door or a state of touching the same (hereinafter, the two states are collectively referred to as a proximate or suchlike state), the upper shin portions are pushed toward the rearward side of the vehicle by the middle chamber and a load is applied to the shins.

In consideration of the circumstances described above, an object of the present invention is to provide a knee airbag device for a vehicle that is capable of moderating a load on the shins when a knee airbag deploys by inflating in a state in which the knees of an occupant are in a state proximate to an airbag door or suchlike.

Means for Addressing the Subject

A knee airbag device for a vehicle relating to a first aspect of the present invention includes: a gas generator that, by operating, generates gas; a knee airbag that is accommodated in a folded state and is disposed at a height of knees of an occupant in a sitting state, and that deploys by inflating toward the knees of the occupant with gas supplied from the gas generator; an upper tether and a lower tether that span between an occupant side base fabric portion and a counter-occupant side base fabric portion of an interior of the knee airbag, and that are disposed along a vehicle width direction at up-down positions sandwiching a gas inflow portion at which the gas from the gas generator inflows; and a gas through-flow control portion that is provided at the upper tether and the lower tether. The gas through-flow control portion is structured to include gas through-flow opening portions that are provided at positions offset in the vehicle width direction relative to upper shin portions of the occupant in a vehicle front view, and upper shin entry allowance portions that are provided at positions coinciding with the upper shin portions in the vehicle front view and that are constituted as small opening portions whose area are specified to be smaller than the gas through-flow opening portions. A pitch of the adjacent upper shin entry allowance portions of the upper tether is specified to be larger than a pitch of the adjacent upper shin entry allowance portions of the lower tether.

A fifth aspect of the present invention is the knee airbag device for a vehicle recited for the first aspect, at least the upper shin entry allowance portions of the gas through-flow control portion are disposed to be offset to the vehicle forward side relative to a center line of a thickness direction of the knee airbag.

A fourteenth aspect of the present invention is the knee airbag device for a vehicle recited for the first aspect, in which the gas generator is disposed at the counter-occupant side base fabric portion side of the interior of the knee airbag, between the upper tether and the lower tether.

A fifteenth aspect of the present invention is the knee airbag device for a vehicle recited for the first aspect, in which a device main body is installed at a vehicle interior member provided at the vehicle forward side of a passenger seat.

A sixteenth aspect of the present invention is the knee airbag device for a vehicle recited for the fifteenth aspect, in which the vehicle interior member is a glove door provided at an instrument panel.

According to the first aspect of the present invention, when the gas generator operates, gas is generated. The generated gas flows into the knee airbag that has been stowed in the folded state.

More specifically, in the present aspect, the upper tether and the lower tether are arranged along the vehicle width direction at upper and lower positions sandwiching the gas inflow portion inside the knee airbag. The upper tether and the lower tether span between the occupant side base fabric portion of the knee airbag and the counter-occupant side base fabric portion. Thus, a thickness of the knee airbag during inflation is regulated. Moreover, gas inflowing through the gas inflow portion first passes along a flow path between the upper tether and the lower tether and is supplied in the vehicle width direction. Therefore, the knee airbag is rapidly deployed by inflating in the vehicle width direction (to left and right) for restraining the knees of the occupant.

Further, a through-flow control portion that is configured to include the gas through-flow opening portions and the upper shin entry allowance portions is provided at the above-mentioned upper tether and lower tether. The upper shin entry allowance portions are structured as small opening portions whose area are specified to be smaller than the gas through-flow opening portions. Thus, a portion of the gas flowing in the vehicle width direction between the upper tether and the lower tether passes through the gas through-flow opening portions and flows to the vehicle upward side or the vehicle downward side, or in the vehicle up-down direction. Therefore, as well as rapidly deploying by inflation in the vehicle width direction, the knee airbag rapidly deploys by inflation to the vehicle upward side or the vehicle downward side, or in the vehicle up-down direction.

Now, in the present aspect, because the knee airbag is disposed at the height of the knees of the occupant in a sitting state, if it is supposed that the occupant is sitting on the vehicle seat in a state in which the knees are proximate to the knee airbag or suchlike (with a vehicle interior member interposed therebetween), the upper shin portions are strongly pushed to the vehicle rearward side by a deployment force of the knee airbag during the deployment by inflation of the knee airbag. However, with the present aspect, because the upper shin entry allowance portions that are constituted as small opening portions whose area are specified to be smaller than the gas through-flow opening portions are disposed at the positions that coincide with the upper shin portions in the vehicle front view, a large amount of the gas flows toward the gas through-flow opening portions which are apart from the upper shin entry allowance portions. Therefore, the upper shin portions may enter further into the upper shin entry allowance portions, or the upper shin portions that have entered further are not strongly pressed to the vehicle rearward side. Therefore, a load on the upper shin portions may be moderated.

Because the upper shin entry allowance portions are small opening portions whose opening areas are specified to be smaller than the gas through-flow opening portions, deployment by inflation of the knee airbag to the vehicle upward side or vehicle downward side or in the vehicle up-down direction is quicker than in a case in which the upper shin entry allowance portions are constituted as the non-opening portions.

Further, because the gas through-flow control portion is provided at both the upper tether and the lower tether, the gas generated from the gas generator is both supplied in the vehicle width direction along the flow path between the upper tether and the lower tether and flows from the flow path in the vehicle up-down direction.

Here, in the present aspect, because the pitch of the adjacent upper shin entry allowance portions at the upper tether is specified to be larger than the pitch of the adjacent upper shin entry allowance portions at the lower tether, the upper tether with the larger pitch may be used for an occupant with a large physique, and the lower tether with the smaller pitch may be used for an occupant with a small physique.

According to the fifth aspect of the present invention, because at least the upper shin entry allowance portions of the gas through-flow control portion are disposed to be offset to the vehicle forward side relative to a thickness direction center line of the knee airbag, even if the upper shin portions of the occupant enter towards the upper shin entry allowance portions, the opening portions that structure the upper shin entry allowance portions are unlikely to be closed off. Therefore, deployment performance of the knee airbag in the vehicle up-down direction is excellently assured.

According to the fourteenth aspect of the present invention, because the gas generator is disposed at the counter-occupant side base fabric portion side of the interior of the knee airbag and between the upper tether and the lower tether, more compact accommodation is possible and a gas supply path from the gas generator to the knee airbag may be made shorter.

According to the fifteenth aspect of the present invention, because the device main body is installed at the vehicle interior member provided at the vehicle forward side of the passenger seat, the knees of an occupant sitting on the passenger seat are restrained.

According to the sixteenth aspect of the present invention, because the vehicle interior member is a glove door provided at the instrument panel, the knee airbag is deployed by inflating from the glove door. Therefore, there is no need to reserve a dedicated space inside the instrument panel for stowing the knee airbag in the folded state.

Effects of the Invention

As described above, the knee airbag device for a vehicle relating to the first aspect of the present invention has an excellent effect in that, in a state in which the knees of an occupant are proximate to the airbag door or suchlike, a load on the shins when the knee airbag deploys by inflation is moderated.

The knee airbag device for a vehicle relating to the first aspect of the present invention has an excellent effect in that the airbag may be more quickly deployed by inflation to the vehicle upward side or the vehicle downward side, or to the vehicle up-down direction.

The knee airbag devices for a vehicle relating to the first aspect of the present invention have excellent effects in that the airbag may be rapidly deployed by inflation in both the vehicle width direction and the vehicle up-down direction, and in that the load moderation effect on the shins and the knee restraint performance may be provided in accordance with physiques of occupants.

The knee airbag devices for a vehicle relating to the fifth aspect of the present invention have an excellent effect in that consistent inflation deployment performance may be assured.

The knee airbag device for a vehicle relating to the fourteenth aspect of the present invention has excellent effects in that the whole device may be made compact and in that a more rapid supply of gas from the gas generator to the knee airbag may be achieved.

The knee airbag device for a vehicle relating to the fifteenth aspect of the present invention has an excellent effect in that lower leg protection performance for an occupant sitting on a passenger seat may be improved.

The knee airbag device for a vehicle relating to the sixteenth aspect of the present invention has an excellent effect in that a flexibility of design of the vehicle interior member may be maintained as in related art.

BEST MODE FOR CARRYING OUT THE INVENTION

Herebelow, several exemplary embodiments of the knee airbag device for a vehicle relating to the present invention are described using FIG. 1A to FIG. 12. An arrow FR that is shown as appropriate in these drawings represents a vehicle forward side, an arrow UP represents a vehicle upward side, and an arrow IN represents a vehicle width direction inner side.

Figure 5:
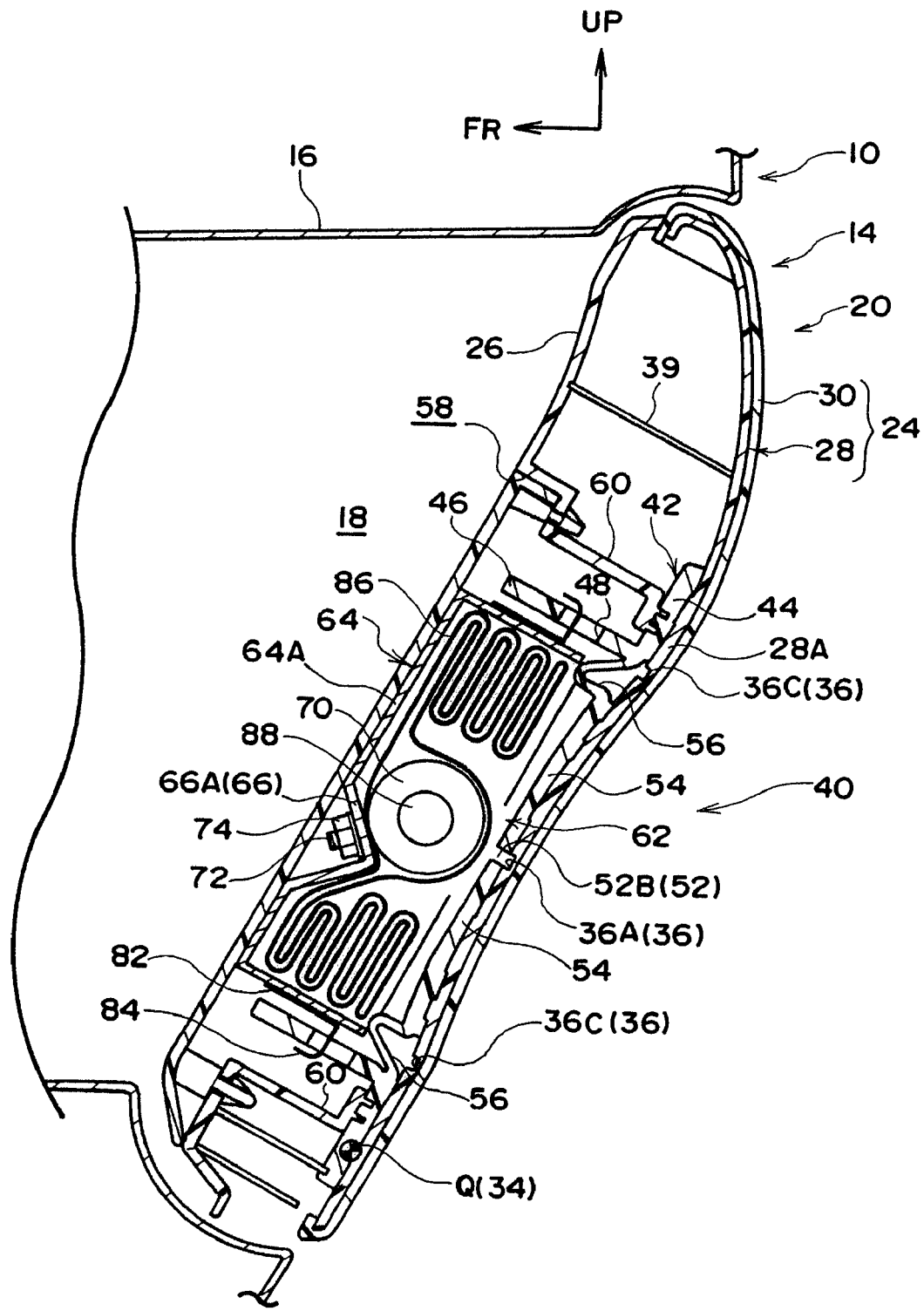
FIG. 5 is a magnified vertical sectional diagram of principal portions of the glove door incorporated-type knee airbag device (a magnified sectional diagram taken along a line 5-5 of FIG. 8).
Figure 6:
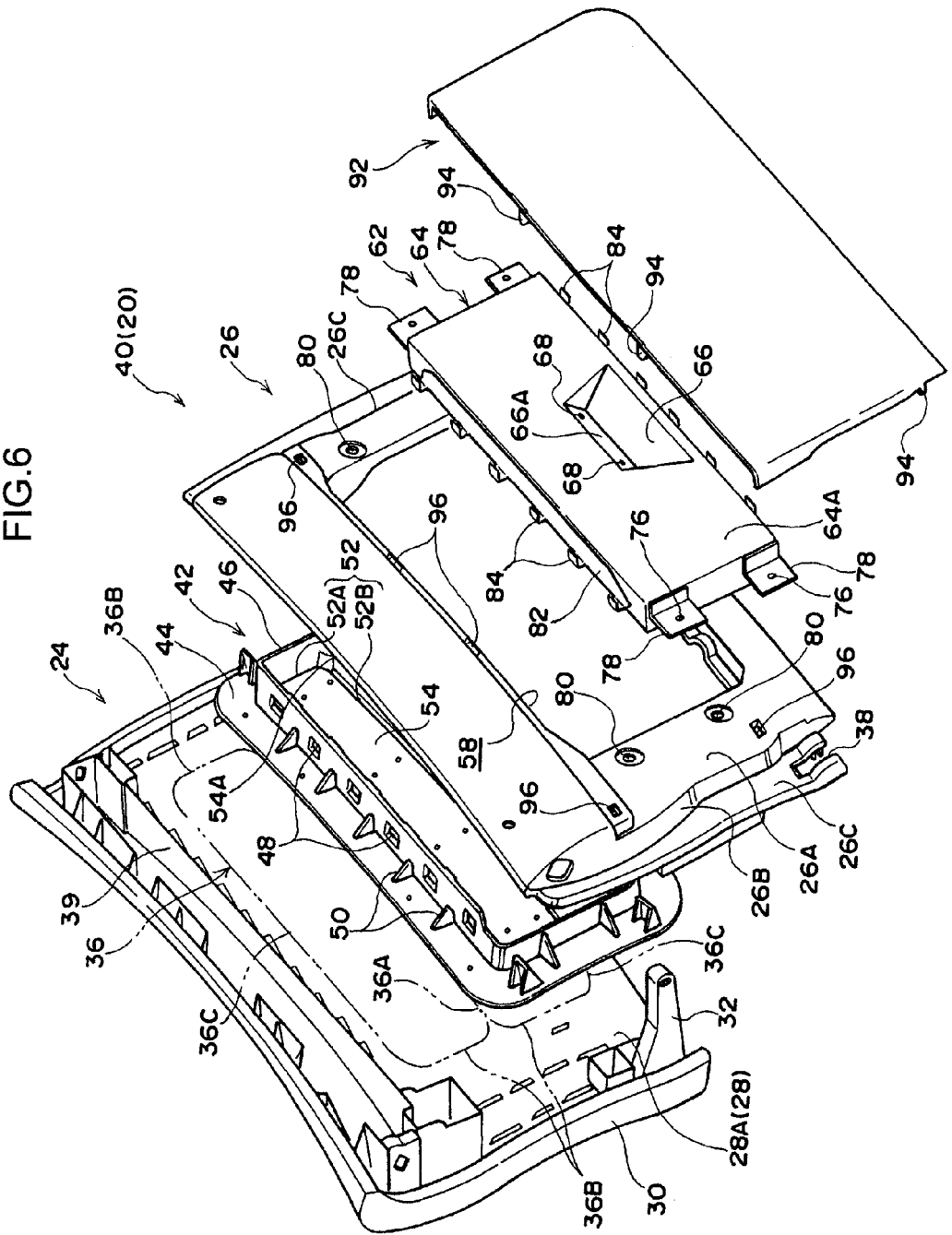
FIG. 6 is an exploded perspective diagram of the glove door.
Figure 7:
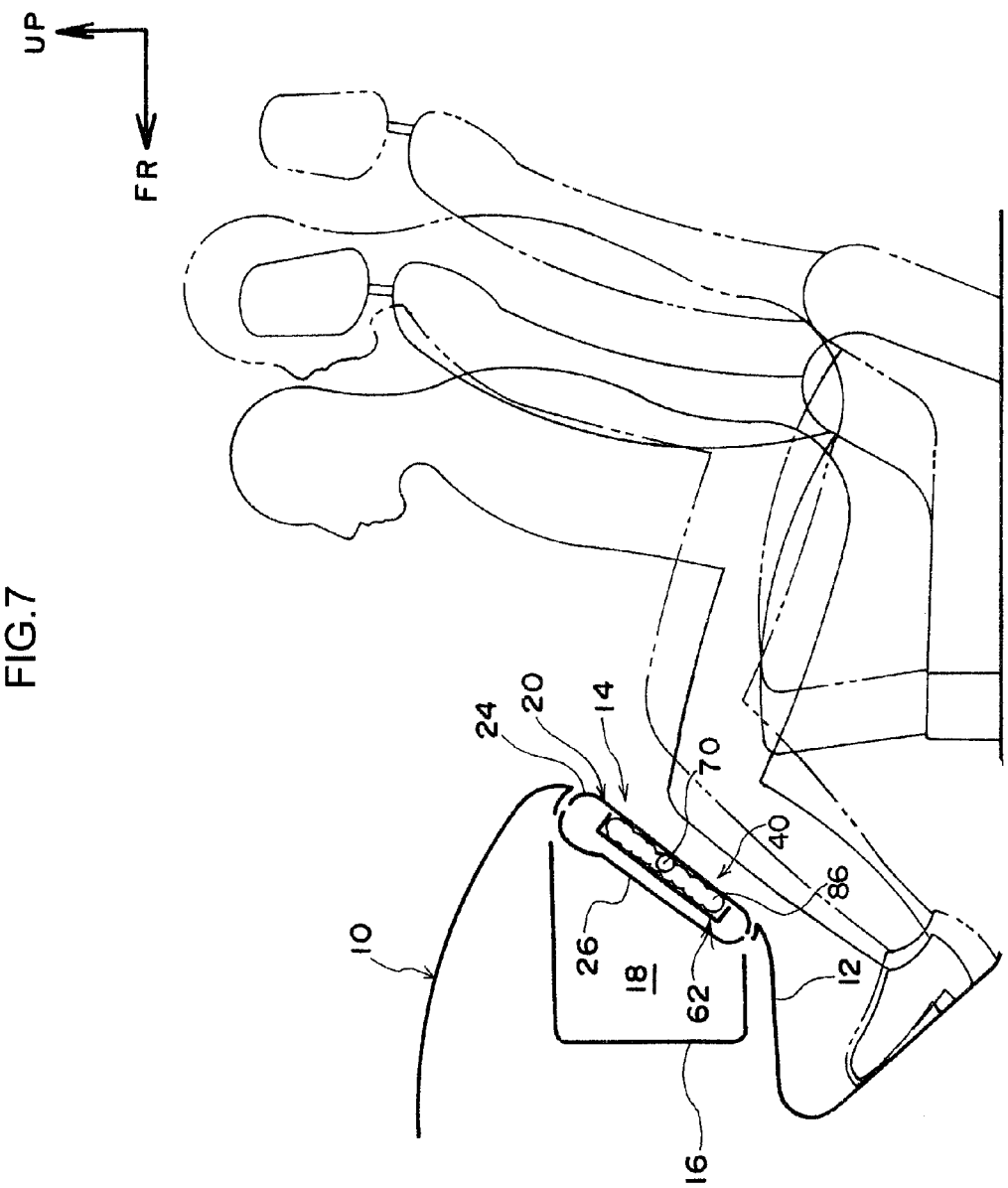
FIG. 7 is a schematic vertical section diagram illustrating a positional relationship between the glove door and a seated occupant, viewed from sideward in the vehicle.
Figure 8:
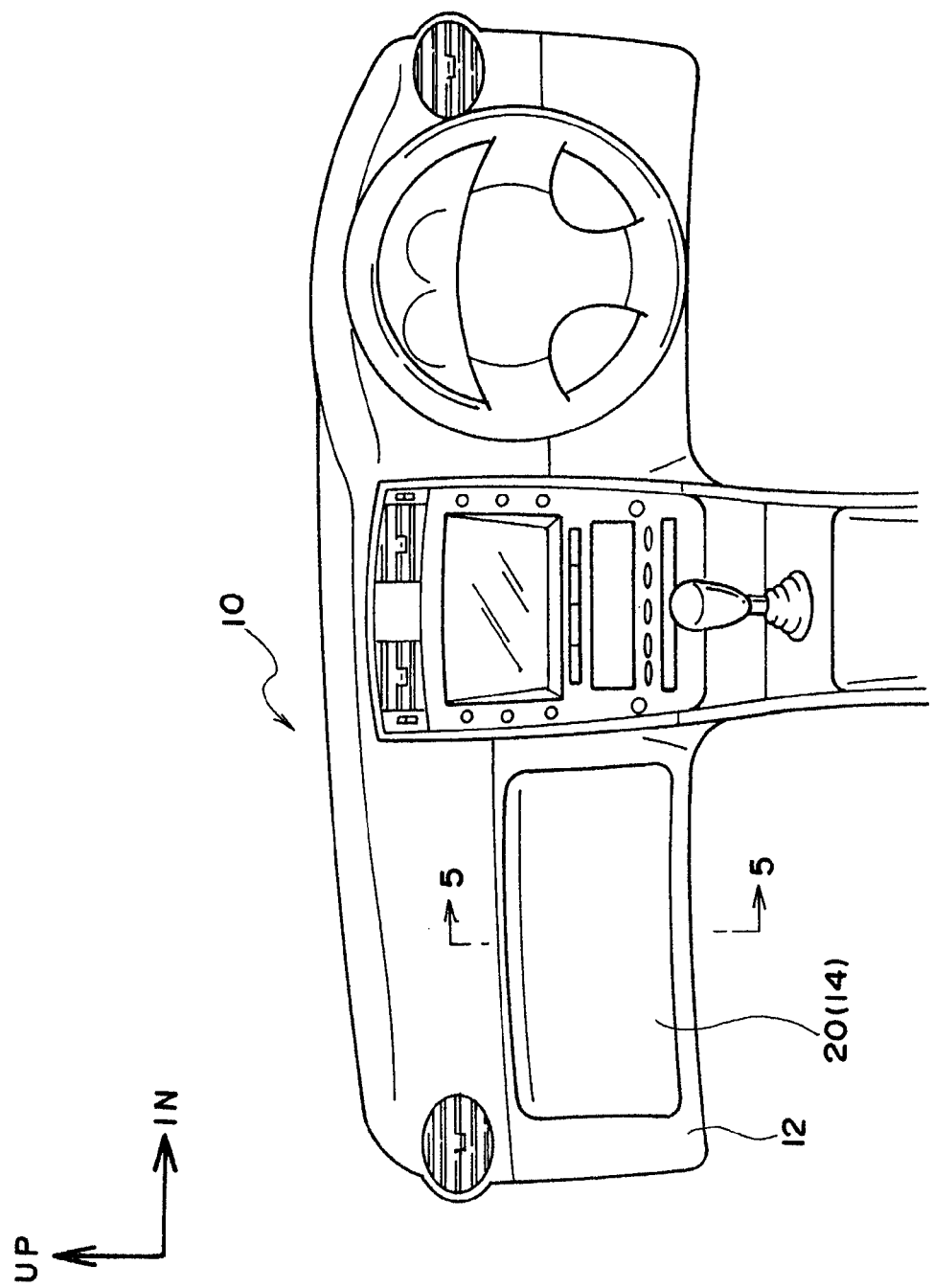
FIG. 8 is an exterior elevational view of an instrument panel in which the glove door incorporated-type knee airbag device relating to the present exemplary embodiment is installed.

FIG. 8 shows an exterior elevational view of an instrument panel in which a glove door incorporated-type knee airbag device relating to a present exemplary embodiment is mounted. FIG. 7 shows a schematic vertical section diagram illustrating a positional relationship between the glove door and a seated occupant, viewed from sideward in the vehicle. FIG. 6 shows an exploded perspective diagram of the glove door. FIG. 5 shows a magnified vertical sectional diagram of principal portions of the glove door incorporated-type knee airbag device relating to the present exemplary embodiment (a magnified sectional diagram taken along line 5-5 of FIG. 8). Firstly, structure of the device as a whole is described using these drawings.

As illustrated in FIG. 8, to serve as a vehicle interior member, a glove box 14 for small items to be put into is provided at a position substantially opposing the knees of an occupant at a passenger seat side of an instrument panel 10, (more precisely, at an upper portion of an instrument panel lower 12 that constitutes a lower portion of the instrument panel 10). As illustrated in FIG. 7, the glove box 14 is structured by a glove box main body 16 made of resin that is formed in a box shape and a glove door 20 that opens and closes an opening portion 18 of the glove box main body 16. The glove box main body 16 is disposed such that the opening portion 18 faces to the vehicle rearward side (a vehicle cabin inner side.).

As illustrated in FIG. 5 to FIG. 7, a glove door incorporated-type knee airbag device 40 is incorporated in the glove door 20 that closes the opening portion 18 of the glove box main body 16 mentioned above. The glove door 20 is provided with a glove door outer 24 in a rectangular panel shape that is disposed at the vehicle cabin inner side and forms a design surface, and a glove door inner 26 formed in a rectangular frame shape that is disposed at the vehicle forward side of the glove door outer 24 and is fitted to the glove door outer 24. The glove door outer 24 and the glove door inner 26 are both made of resin.

As illustrated in FIG. 5 and FIG. 6, the glove door outer 24 is structured as a two-layer structure, of a base member 28 that is formed in a substantially rectangular panel shape and a skin 30 that covers a vehicle cabin inner side surface of the base member 28. The base member 28 and the skin 30 are both made of resin, but the skin 30 is structured of a softer resin material than the base member 28. A pair of left and right stoppers 32 is provided standing from both sides of the lower edge side of the base member 28 of the glove door outer 24. The stoppers 32 protrude from a general portion 28A of the base member 28 in a direction orthogonal to the surface (to the vehicle forward side), and distal end portions thereof interfere with a wall surface of the glove box main body 16 when the glove door 20 is in a fully open state. Thus, the stoppers 32 serve to retain the glove door 20 at a fully open position.

Hinges 34 that are formed in substantial letter L shapes in side view are provided at the inner sides of the stoppers 32. One end portions of the hinges 34 are fixed by screws or the like to the glove box main body 16, and the glove door 20 turns around an axis of turning Q in FIG. 5 when the glove door 20 is opening and closing.

As illustrated in FIG. 5, tear portions 36 are specified at a vehicle cabin outer side surface (the surface at the glove door inner 26 side) of the general portion 28A of the glove door outer 24. The tear portions 36 are in a substantial letter B shape that breaks when an inflation pressure of at least a predetermined value acts via an airbag door retainer 42 which is described below. The tear portions 36 are constituted by a width direction central tear portion 36A that extends along the vehicle width direction at a vehicle up-down direction central portion of the general portion 28A, a pair of left and right vertical direction tear portions 36B that extend in the vehicle up-down direction from each of the two end portions of the width direction central tear portion 36A, and lateral direction upper and lower tear portions 36C that link distal end portions of the vertical direction tear portions 36B to one another.

Meanwhile, the glove door inner 26 is structured to include a rectangular frame-form bottom wall portion 26A that opposes the general portion 28A of the base member 28 of the glove door outer 24, a pair of left and right side wall portions 26B that are formed integrally with two vehicle lateral direction side portions of the bottom wall portion 26A, and a pair of left and right protruding portions 26C that protrude towards vehicle width direction outer sides from end portions of the pair of left and right side wall portions 26B at the glove door outer 24 side thereof. Notches 38 are formed at lower edge sides of the protruding portions 26C, at positions opposing the stoppers 32 of the glove door outer 24. The stoppers 32 pass into these notches 38.

The glove door outer 24 and the glove door inner 26 of the structure described above are joined together via vertical direction and horizontal direction ribs 39 that are formed at least one of those two (see FIG. 5). Specifically, the glove door outer 24 and the glove door inner 26 are vibration-welded to distal end portions of the ribs 39. However, fastening with fasteners may be used or vibration welding and fastening may be used in combination, and a configuration in which the glove door outer 24 and the glove door inner 26 may be made integral is sufficient.

As illustrated in FIG. 5 and FIG. 6, the airbag door retainer 42, made of plastic formed in a substantially rectangular plate shape, is provided between the glove door outer 24 and glove door inner 26 described above. The airbag door retainer 42 is provided with a rectangular flat plate-form base portion 44 and a rectangular frame-form vertical wall portion 46, which is provided standing from vicinities of outer periphery portion of the base portion 44. Plural anchor holes 48 are formed with predetermined spacings in an upper portion and a lower portion of the vertical wall portion 46. The anchor holes 48 are structured as rectangular openings. A plural number of ribs for reinforcement 50 are provided standing between vicinity portions of the outer periphery portions of the base portion 44 and the vertical wall portion 46. The ribs for reinforcement 50 are disposed so as to span between those two, and are formed in right-angled triangle shapes in side view.

Slits 52 are formed in a central portion (a region encircled by the vertical wall portion 46) of the base portion 44 of the airbag door retainer 42. The slits 52 are formed in a letter H shape in front view, by a pair of left and right vertical slits 52A and a lateral slit 52B that links the vertical slits 52A to one another. A pair of upper and lower airbag doors 54 is formed by these slits 52. Corner portions 54A at the lateral slit 52B side of each airbag door 54 are formed in circular arc shapes. Slacking portions 56 (see FIG. 5), which are formed in substantial letter V shapes in side view, are formed at turning axis sides of the airbag doors 54. When the airbag doors 54 are deploying, the slacking portions 56 are extended, such that the airbag doors 54 deploy smoothly.

As illustrated in FIG. 5, a pair of upper and lower ribs 60 that protrude toward the airbag door retainer 42 are integrally formed at an upper edge portion and a lower edge portion of a central opening portion 58 in the bottom wall portion 26A of the above-described glove door inner 26. In the assembled state of the glove door 20, these ribs 60 are provided to be substantially parallel with outer sides of an upper wall portion and a lower wall portion of the vertical wall portion 46 of the airbag door retainer 42. Respective distal end portions of the ribs 60 are welded (vibration-welded) to the base portion 44 of the airbag door retainer 42. Thus, the base portion 44 of the airbag door retainer 42 is fixed in a state that is nipped between the general portion 28A of the base member 28 of the glove door outer 24 and the ribs 60 of the glove door inner 26.

As illustrated in FIG. 5 and FIG. 6, an airbag module 62 is mounted at the central opening portion 58 of the glove door inner 26. The airbag module 62 is provided with a module case 64 made of metal. The module case 64 is formed in a box shape with a thin floor. An inflator fixing portion 66, which protrudes toward the vehicle rearward side, is provided at a central lower portion of a floor wall portion 64A of the module case 64 by an isosceles trapezoid shape being knocked in from the vehicle forward side. A shape of the inflator fixing portion 66 in a vertical sectional view forms a mountain shape. A pair of left and right bolt insertion holes 68 is formed in an inclined portion 66A at the vehicle upward side of this inflator fixing portion 66. A pair of stud bolts 72 (see FIG. 5), which protrude toward a radial direction outer side of an inflator 70 from an axial direction central portion of the inflator 70, are inserted into these bolt insertion holes 68, and nuts 74 are threadingly engaged therewith from a rear face side. Thus, the inflator 70 is fastened and fixed to the inclined portion 66A of the inflator fixing portion 66.

Letter L-shaped attachment pieces 78 are attached to each of a total of four locations at two side portions of the module case 64. Bolt insertion holes 76 are formed at central portions of the attachment pieces 78. In correspondence therewith, bolt insertion holes 80 are formed coaxially with the bolt insertion holes 76 at both sides of the central opening portion 58 of the glove door inner 26. The bolt insertion holes 76 of the attachment pieces 78 are made to correspond with the bolt insertion holes 80 at the glove door inner 26 side, and are fastened and fixed with unillustrated fastening members such as bolts or the like. Thus, the module case 64 is fixed to the central opening portion 58 of the glove door inner 26 from the vehicle forward side thereof.

Long strip-form anchor fixtures 82 are attached to an upper portion and a lower portion of the module case 64. Anchor pieces 84 that are letter L-shaped in side view are integrally formed at one edge of the anchor fixtures 82 (at the airbag door retainer 42 side thereof). The anchor pieces 84 are plurally separately provided in correspondence with the aforementioned anchor holes 48 formed in the vertical wall portion 46 of the airbag door retainer 42. The airbag door retainer 42 is attached to the module case 64 by the anchor pieces 84 being inserted into and anchored at the anchor holes 48.

As illustrated in FIG. 5, the inflator 70, which serves as a gas generator, and a knee airbag 86 that is inflated by gas being emitted from the inflator 70 are assembled inside the module case 64. This inflator 70 is formed in a cylinder shape whose outer diameter is accommodated in the module case 64. A gas emission portion 88 is coaxially formed at an end portion of the axial direction of the inflator 70. The gas emission portion 88 has an outer diameter that is smaller than the outer diameter of the inflator 70, and plural gas emission holes are formed in a peripheral wall portion of the gas emission portion 88.

Meanwhile, the knee airbag 86 is accommodated in the module case 64 in a folded state. More specifically, it is folded to a size that can be accommodated in the module case 64 by an upper portion and a lower portion of the knee airbag 86 in a flat deployed state each being bellows-folded and brought toward a central portion. Then the inflator 70 is inserted into the central portion (a height direction central portion) of the knee airbag 86, and the stud bolts 72 protruding from the inflator 70 pass through the knee airbag 86 and are fixed to the inflator fixing portion 66 of the module case 64 by the procedure described above. Thus, the knee airbag 86 is assembled in a state of being nipped between the inflator 70 and the inflator fixing portion 66. In the state in which the glove door incorporated-type knee airbag device 40 is assembled to the vehicle, the inflator 70 of the knee airbag 86 serves as an inflow portion 87 (see FIG. 4).

The central opening portion 58 of the glove door inner 26 is closed off after assembly of the airbag module 62 by a rear face cover 92 made of resin, which is formed in a rectangular plate shape. Plural leg portions 94 are integrally formed from four edges of the rear face cover 92 towards the glove door inner 26. Pawls are formed at distal end portions of the leg portions 94. Correspondingly, plural rectangular insertion holes 96 are formed in the bottom wall portion 26A of the glove door inner 26 at outer periphery portions of the central opening portion 58. The rear face cover 92 is attached to the vehicle forward side surface of the glove door inner 26 by the leg portions 94 being inserted into the insertion holes 96 and resiliently engaged.

Next, principal elements of the present exemplary embodiment are described.

As illustrated in FIG. 1A to FIG. 4, the knee airbag 86 is formed in a flat, substantially cuboid shape. An upper-lower pair of an upper tether 100 and a lower tether 102 is provided substantially in parallel inside the knee airbag 86. The upper tether 100 is formed in a long, narrow rectangular shape. The upper tether 100 is made integral with the knee airbag 86 by a front end portion 100A and a rear end portion 100B being stitched to a counter-occupant side base fabric portion 86A and an occupant side base fabric portion 86B of the knee airbag 86, respectively. A length direction dimension of the upper tether 100 is specified to be shorter than a width direction dimension of the knee airbag 86.

Similarly, the lower tether 102 is formed in a long, narrow rectangular shape. The lower tether 102 is made integral with the knee airbag 86 by a front end portion 102A and a rear end portion 102B being stitched to the counter-occupant side base fabric portion 86A and the occupant side base fabric portion 86B of the knee airbag 86, respectively. A length direction dimension of the lower tether 102 is specified to be shorter than the width direction dimension of the knee airbag 86.

Because the upper tether 100 and the lower tether 102 are provided, a thickness of the knee airbag 86 during deployment by inflation is regulated so as to be a predetermined thickness. Furthermore, because the upper tether 100 and the lower tether 102 are provided, the interior of the knee airbag 86 is divided into a middle flow path 108, an upper portion flow path 110, a lower portion flow path 112, and a pair of left and right side flow paths 114. The middle flow path 108 is demarcated by the upper tether 100 and the lower tether 102 and extends in the vehicle width direction. The upper portion flow path 110 is demarcated by the upper tether 100 and an outer periphery upper portion 86C of the knee airbag 86, and extends in the vehicle width direction. The lower portion flow path 112 is demarcated by the lower tether 102 and an outer periphery lower portion 86D of the knee airbag 86, and extends in the vehicle width direction. The left and right side flow paths 114 communicate in the vehicle up-down direction between respective length direction end portions of the middle flow path 108, the upper portion flow path 110 and the lower portion flow path 112.

The aforementioned inflator 70 is disposed in a horizontal placement at a length direction middle portion of the middle flow path 108 of the knee airbag 86. When the inflator 70 is disposed thus, the gas emission portion 88 of the inflator 70 is disposed so as to be located at the length direction middle portion of the middle flow path 108. However, the inflator 70 need not necessarily be disposed thus. If the gas emission portion 88 of the inflator 70 is disposed at a position that is offset from the length direction middle portion of the middle flow path 108, the flow may be straightened by an unillustrated diffuser (a flow-straightener) and gas may be emitted to the length direction middle portion of the middle flow path 108.

First opening portions 104 and second opening portions 106 are alternatingly formed in the aforementioned upper tether 100 and lower tether 102. The first opening portions 104 are large diameter gas through-flow holes that serve as gas through-flow opening portions. The second opening portions 106 are small diameter gas through-flow holes that serve as upper shin entry allowance portions. In other words, opening areas of the first opening portions 104 are specified to be larger than opening areas of the second opening portions 106. Both the first opening portions 104 and the second opening portions 106 correspond to a gas through-flow control portion of the present invention.

Figure 1A:
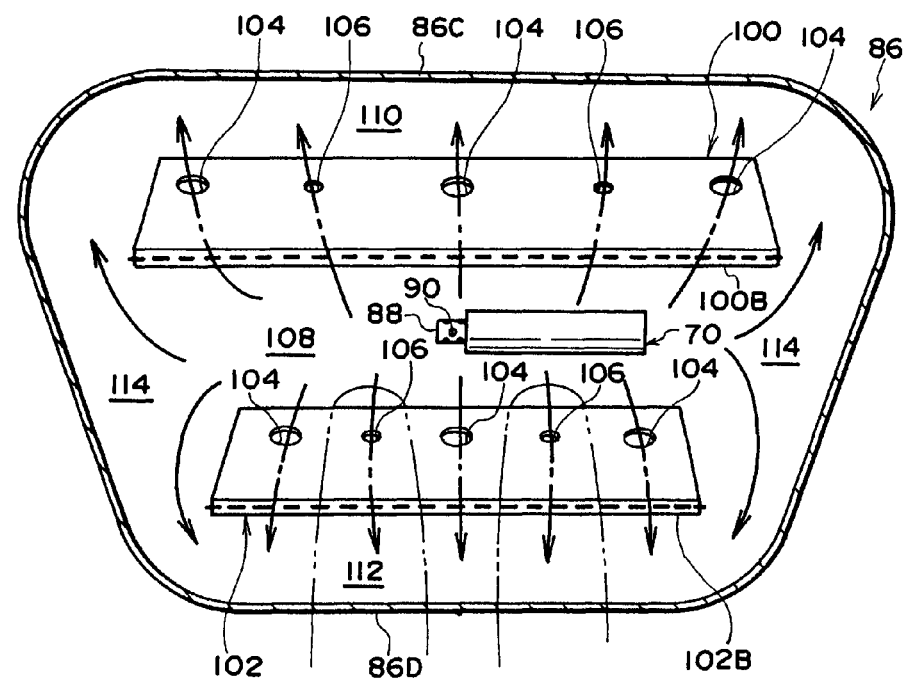
FIG. 1A is a vertical sectional diagram illustrating a state in which a knee airbag of a glove door incorporated-type knee airbag device relating to a present exemplary embodiment deploys by inflating, in relation to a small occupant.
Figure 1B:
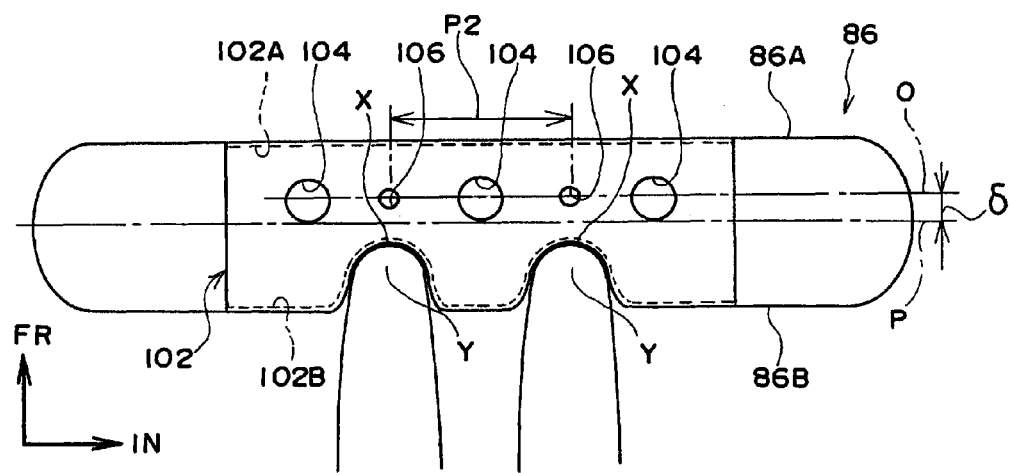
FIG. 1B is a plan diagram illustrating the state in which the knee airbag of the glove door incorporated-type knee airbag device relating to the present exemplary embodiment deploys by inflating, in relation to the small occupant.
Figure 2A:
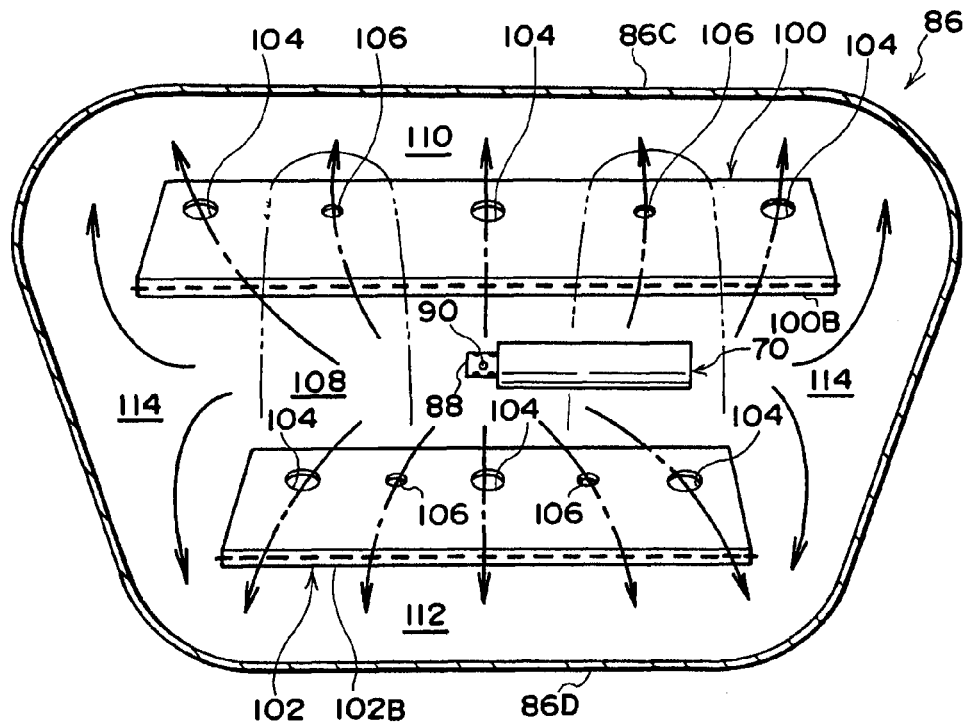
FIG. 2A is a vertical sectional diagram illustrating the state in which the knee airbag of the glove door incorporated-type knee airbag device relating to the present exemplary embodiment deploys by inflating, in relation to a large occupant.
Figure 2B:
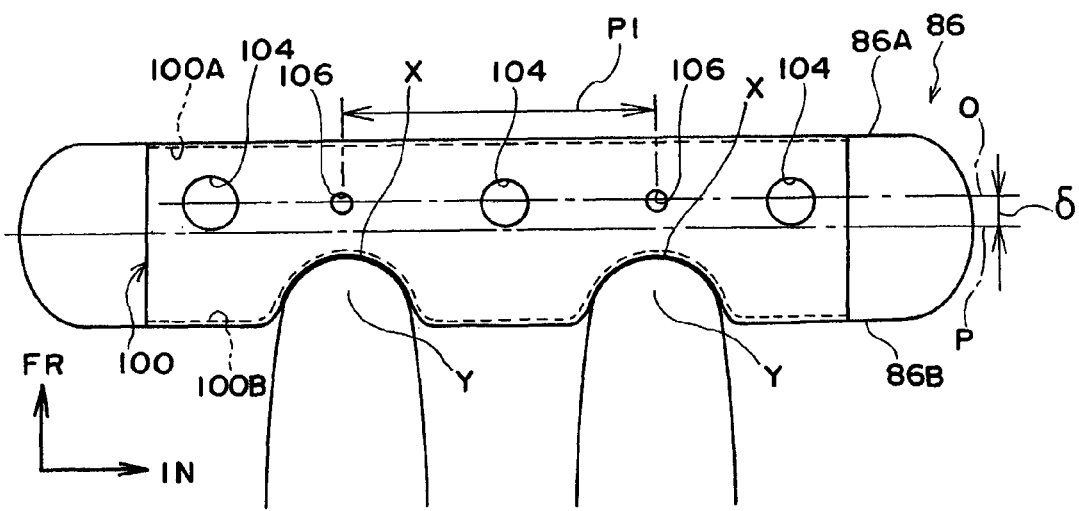
FIG. 2B is a plan diagram illustrating the state in which the knee airbag of the glove door incorporated-type knee airbag device relating to the present exemplary embodiment deploys by inflating, in relation to the large occupant.
Figure 3:
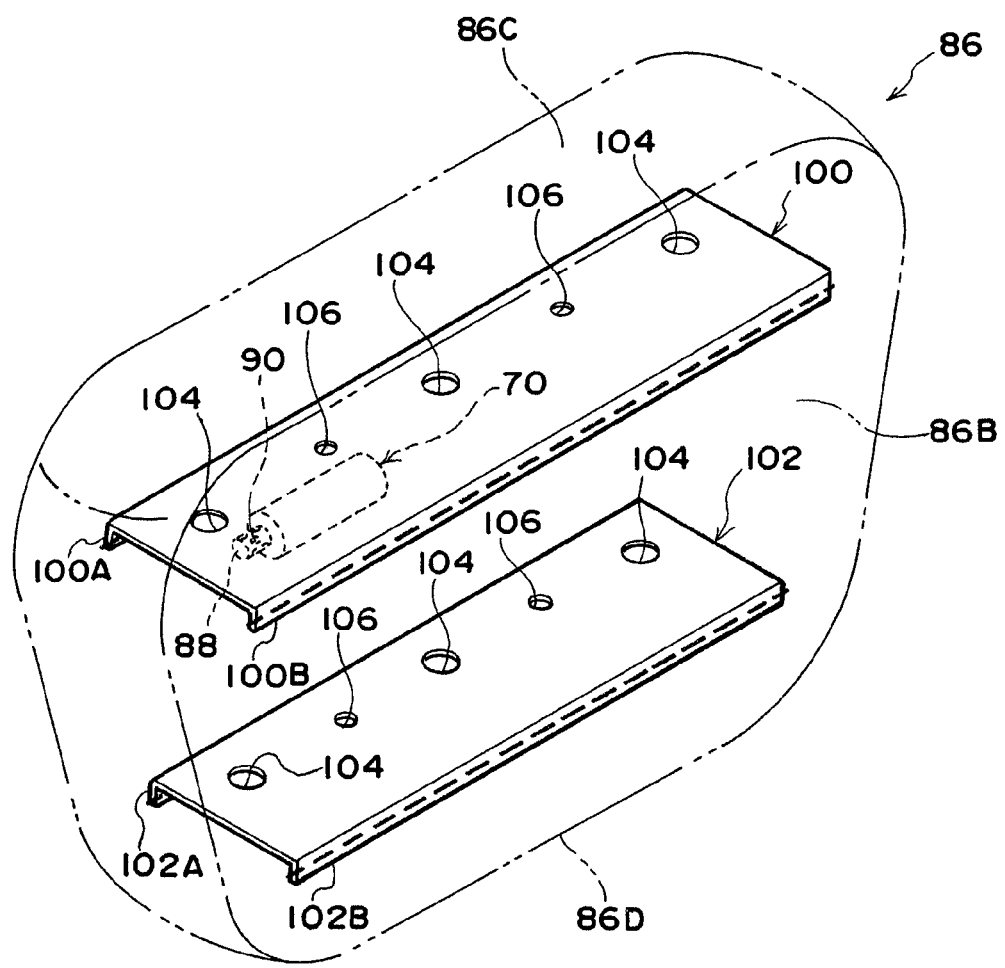
FIG. 3 is a perspective diagram illustrating an inflation deployment state of the knee airbag illustrated in FIG. 1.

As illustrated in FIG. 1A to FIG. 2B, two of the second opening portions 106 are formed in the upper tether 100. As illustrated in FIG. 2B, the second opening portions 106 are provided at positions that coincide with upper shin portions X of a seated occupant in a front view of the vehicle (see FIG. 4) when the seated occupant is a large occupant (the occupant shown by two-dot chain lines in FIG. 7).

Figure 4:
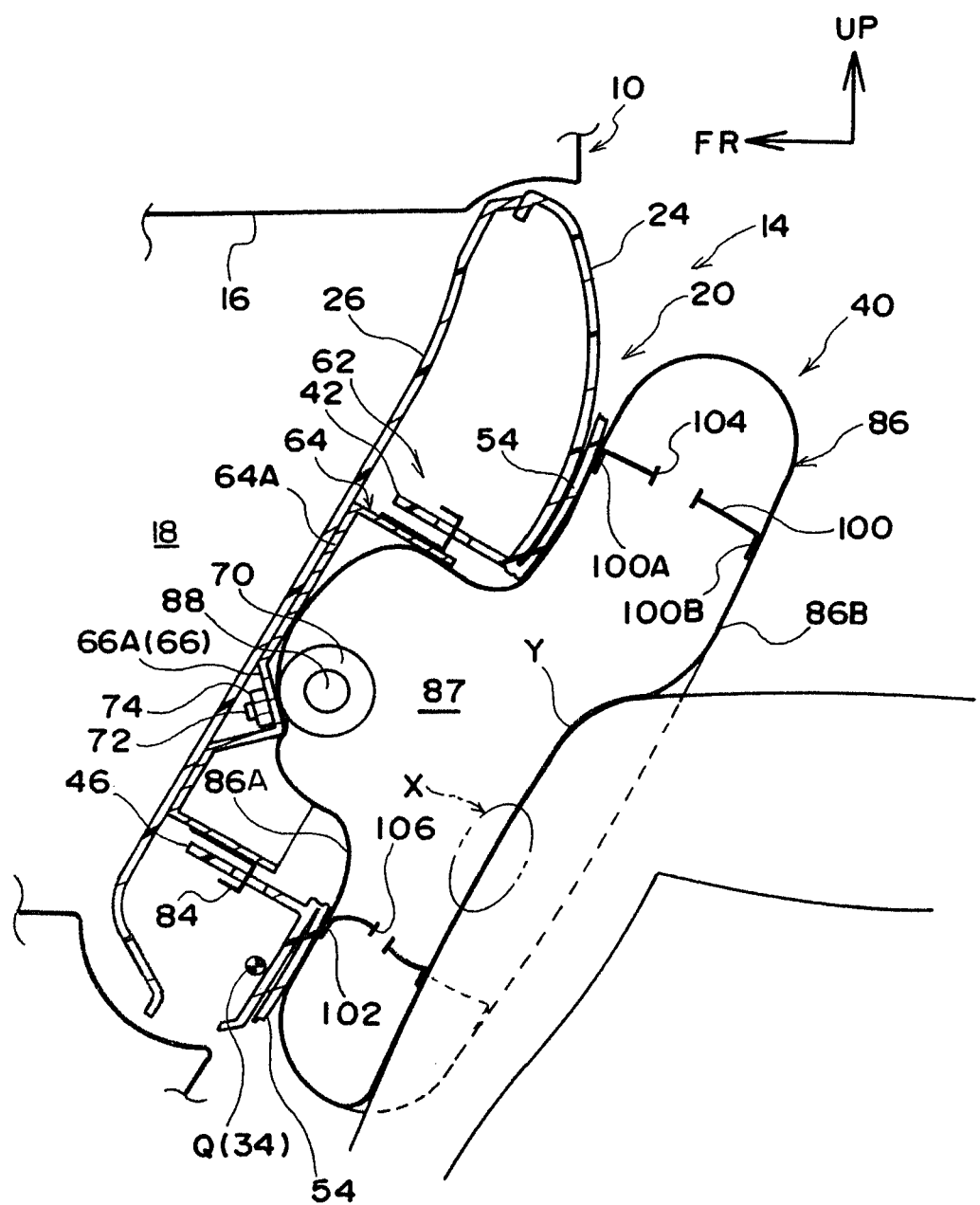
FIG. 4 is a vertical sectional diagram illustrating an operating state of the glove door incorporated-type knee airbag device relating to the present exemplary embodiment, viewed from sideward in the vehicle.

In addition, FIG. 4 illustrates a state in which the glove door incorporated-type knee airbag device 40 is operating when the seated occupant is a large occupant, in a side view. The portion arrowed with the line X in FIG. 4 is the upper shin portions of the occupant. The upper shin portions are locations corresponding to directly below kneecaps (knee joints) Y. Because FIG. 1B is a diagram seen in plan view, the upper shin portions look to locate as being coincide with the kneecaps. However, in order to distinguish the two, the kneecaps Y are shown labeled from the center of the knees, and the upper shin portions X are shown labeled from outer peripheries of the shins FIG. 2B and so forth are marked in a similar manner.

Similarly, as illustrated in FIG. 1A to FIG. 2B, two of the second opening portions 106 are formed in the lower tether 102. As illustrated in FIG. 1B, the second opening portions 106 are provided at positions that coincide with upper shin portions X of a seated occupant in the front view of the vehicle (see FIG. 4) when the seated occupant is a small occupant (the occupant shown by solid lines in FIG. 7).

Accordingly, a pitch P1 of the second opening portions 106 of the upper tether 100 (see FIG. 2B) is specified to be larger than a pitch P2 of the second opening portions 106 of the lower tether 102 (see FIG. 1B).

Herein, the first opening portions 104 are formed respectively at outer sides of and between the second opening portions 106.

As illustrated in FIG. 1B and FIG. 2B, the first opening portions 104 and the second opening portions 106 are all formed as circular holes, and are arranged at matching positions in the vehicle width direction. A center line O of these first opening portions 104 and second opening portions 106 is disposed to be offset to the vehicle forward side by a distance δ from a center line P of the thickness direction of the knee airbag 86 in the deployed state thereof.

Operation and Effects of the Present Exemplary Embodiment

Next, operation and effects of the present exemplary embodiment are described.

When a vehicle in which the glove door incorporated-type knee airbag device 40 with the structure described above is employed has a frontal collision, this state is detected by an unillustrated collision detector, and a detection signal is outputted to an airbag electronic control unit (ECU). When airbag operation is decided on by the airbag ECU, various airbag devices operate at the driver seat side. In addition, the glove door incorporated-type knee airbag device 40 at the passenger seat side operates. That is, a predetermined current is passed through a squib in the inflator 70 of the airbag module 62 incorporated in the glove door 20, and the inflator 70 is operated. Hence, gas is generated from the inflator 70, and this gas is supplied into the knee airbag 86 accommodated in the glove door 20 in the folded state and causes the same to inflate.

When the knee airbag 86 in the folded state inflates and a bag inflation pressure acting on the tear portions 36 via the airbag door retainer 42 reaches a predetermined value, the tear portions 36 break, and the pair of airbag doors 54 are deployed upward and downward. Hence, the knee airbag 86 deploys by inflating in a space between the knees of the occupant and the glove door 20 (the instrument panel 10). As a result, the knees of the occupant are restrained by the knee airbag 86 and protected.

In addition, because the upper tether 100 and the lower tether 102 are disposed inside the knee airbag 86, a thickness during inflation of the knee airbag 86 is regulated by the lengths along the vehicle front-rear direction of the upper tether 100 and the lower tether 102. Furthermore, because the inflator 70 is disposed at the substantial middle portion of the knee airbag 86, the gas emitted from the gas emission portion 88 first flows into the middle flow path 108 and is supplied in the vehicle width direction. Therefore, the knee airbag 86 deploys rapidly in the vehicle width direction, and rapidly deploys even if a space between the knees of the occupant and the glove door 20 (the instrument panel 10) is narrow. The gas supplied through the middle flow path 108 in the vehicle width direction reaches to the left and right side flow paths 114, separates up and down, and is supplied into the upper portion flow path 110 and the lower portion flow path 112. Here, because the first opening portions 104 and the second opening portions 106 are formed in the upper tether 100 and the lower tether 102, a portion of the gas flowing through the middle flow path 108 in the vehicle width direction passes through the first opening portions 104 and the second opening portions 106 and flows into the upper portion flow path 110 and the lower portion flow path 112. Therefore, the knee airbag 86 is deployed by inflating rapidly both in the vehicle width direction and in the vehicle up-down direction. Flows of the gas are illustrated by arrows in FIG. 1A and FIG. 2A.

Now, in the present exemplary embodiment, because the knee airbag 86 is disposed at the height of the knees of the occupants in the sitting state, if it is supposed that the occupant is sitting on the passenger seat in a state in which the knees are proximate to the glove door 20 or suchlike, the upper shin portions X are strongly pushed to the vehicle rearward side by deployment reaction force of the knee airbag 86 during deployment by inflation of the knee airbag 86. However, in the present exemplary embodiment, because the second opening portions 106 with smaller diameters than the first opening portions 104 are disposed at positions that coincide with the upper shin portions X in the vehicle front view, a large amount of the gas is allowed to flow toward the first opening portions 104 which is apart from the second opening portions 106. Therefore, the upper shin portions X may enter further in toward the second opening portions 106, or the upper shin portions X that have entered further in are not strongly pressed to the vehicle rearward side. That is, because more of the gas flows through the first opening portions 104, a larger pressure force is generated at the first opening portions 104, and because less of the gas flows through the second opening portions 106, a smaller pressure force is generated at the second opening portions 106. Therefore, loads on the upper shin portions X may be moderated. As a result, according to the present exemplary embodiment, loads on the shins when the knee airbag 86 deploys by inflating in a state in which the knees of an occupant are proximate to the airbag door or suchlike may be moderated.

Moreover, in the present exemplary embodiment, because the second opening portions 106 with smaller opening areas than the first opening portions 104 are provided at the positions at which the upper shin portions X enter in, deployment by inflation of the knee airbag 86 in the vehicle up-down direction is faster than in a configuration in which the openings are not provided at all. Therefore, according to the present exemplary embodiment, the knee airbag 86 may be more quickly deployed by inflating in not only the vehicle width direction but also the vehicle up-down direction.

Because the present exemplary embodiment includes the upper tether 100 and the lower tether 102, and the pitch P1 of the second opening portions 106 in the upper tether 100 is specified to be larger than the pitch P2 of the second opening portions 106 in the lower tether 102, the upper tether 100 may be used for occupants with large physiques and the lower tether 102 used for occupants with small physiques. Therefore, according to the present exemplary embodiment, the knee airbag 86 may be deployed by inflating rapidly in both the vehicle width direction and the vehicle up-down direction, and a load moderation effect on the upper shin portions X and knee restraint performance may be obtained in accordance with the physiques of occupants.

In the present exemplary embodiment, because the first opening portions 104 and the second opening portions 106 are disposed to be offset by the distance δ to the vehicle forward side from the center line P of the thickness direction of the knee airbag 86, even when the upper shin portions X of the occupant enter in towards the second opening portions 106, the second opening portions 106 are unlikely to be closed up. Therefore, inflation deployment performance of the knee airbag 86 in the vehicle up-down direction is excellently assured. As a result, consistent inflation deployment performance of the knee airbag 86 in the vehicle up-down direction may be assured.

In the present exemplary embodiment, because the inflator 70 is disposed between the upper tether 100 and the lower tether 102 at the counter-occupant side base fabric portion 86A side of the interior of the knee airbag 86, the airbag module 62 may be made compact accommodation, and a gas supply path from the inflator 70 to the knee airbag 86 may be made short. As a result, the device as a whole may be made compact and a more rapid supply of gas from the inflator 70 to the knee airbag 86 may be enabled.

Additionally, because the glove door incorporated-type knee airbag device 40 is installed in the glove door 20 (the instrument panel 10) provided at the vehicle forward side of the passenger seat, lower leg protection performance of an occupant sitting on the passenger seat may be improved.

Because the airbag module 62 is incorporated in the glove door 20, there is no need to reserve a dedicated space for stowing the knee airbag 86 in the folded state inside the instrument panel 10. Therefore, a degree of freedom of design of the instrument panel 10 as in related art may be preserved.

Variations of the Present Exemplary Embodiment

Next, several variations of the knee airbag device for a vehicle relating to the present invention are described using FIG. 9 to FIG. 12. Structural portions that are the same as in the exemplary embodiment described above are assigned the same reference numerals and descriptions thereof are not given.

Figure 9:
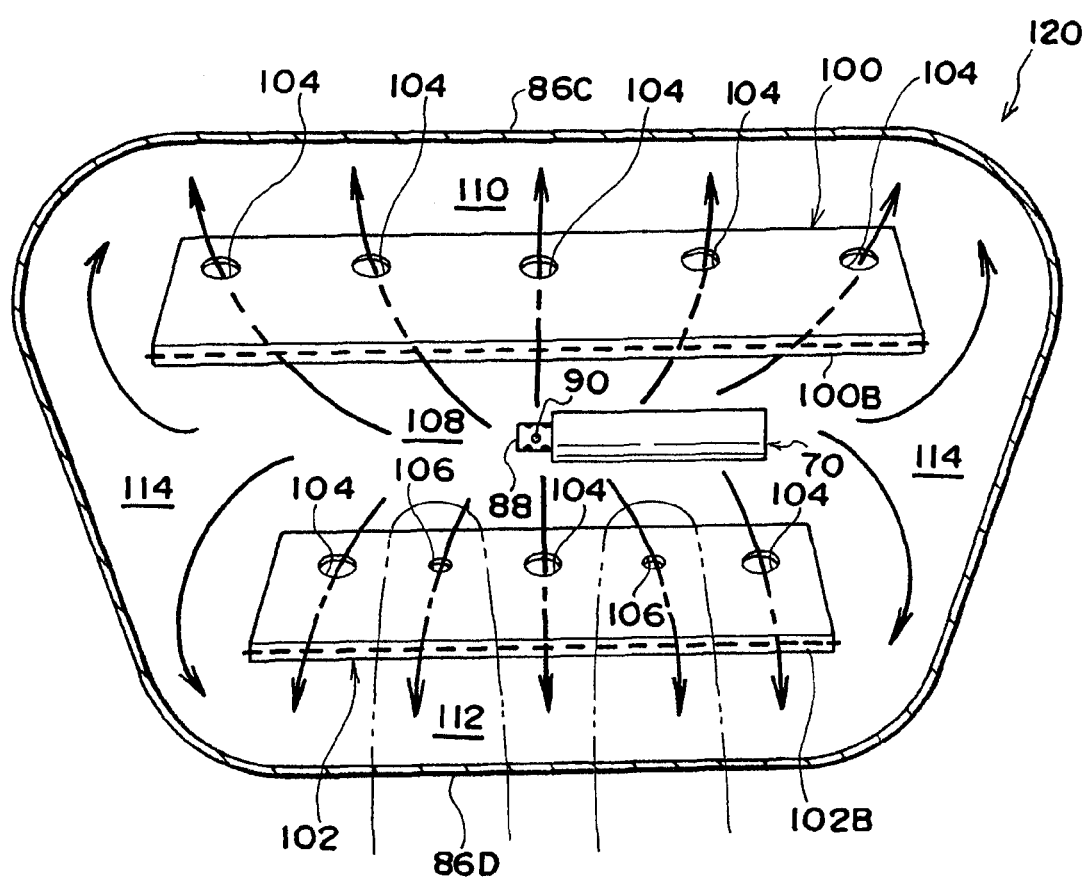
FIG. 9 is a vertical sectional diagram illustrating a knee airbag relating to a first variation.

In a knee airbag 120 illustrated in FIG. 9, both the first opening portions 104 and the second opening portions 106 are formed in the lower tether 102, but only the first opening portions 104 are formed in the upper tether 100.

In the case of the above described knee airbag 120, the upper shin portions X are allowed to enter in only for a small occupant. That is, when the knee airbag 120 deploys by inflating, to what extent the upper shin portions X of the occupant are pushed to the vehicle rearward side varies with relative positional relationships of the deployment height of the knee airbag 120 (in other words, an installation position of the airbag module 62) and the height of the knees of the occupant (which may instead be referred to as the height of the upper shin portions X). Thus, it is thought that a load on the shins when the knee airbag 120 deploys by inflating may be small for a large occupant and a load on the shins may be large for a small occupant, depending on a style of curvature and the like of the instrument panel 10 and the glove door 20 or the like. In this case, as illustrated in FIG. 9, it is sufficient just for the second opening portions 106 to be provided only in the lower tether 102.

For similar reasons, conversely to the above description, the second opening portions 106 may be provided only at the upper tether 100.

Figure 10:
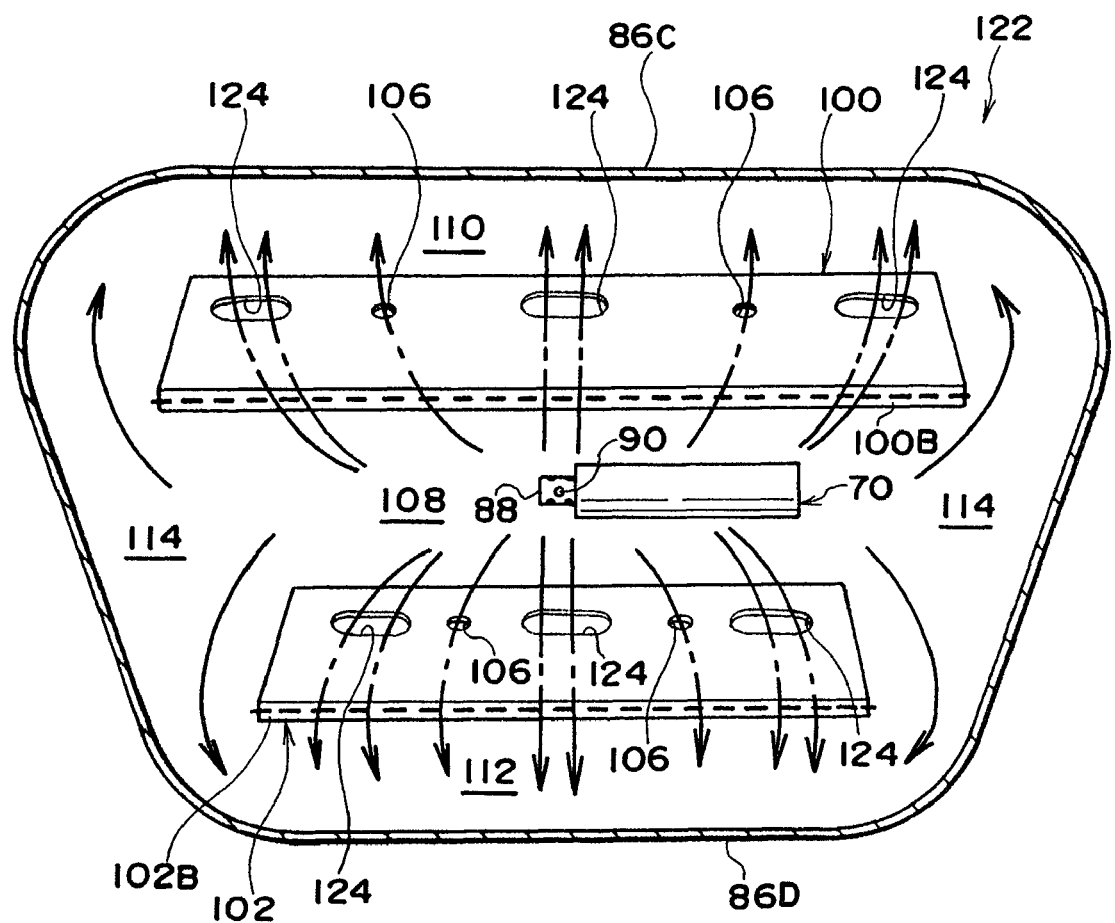
FIG. 10 is a vertical sectional diagram illustrating a knee airbag relating to a second variation.

A knee airbag 122 illustrated in FIG. 10 is characterized by the shapes of first opening portions 124 in the upper tether 100 and the lower tether 102 being not circles but oval shapes. In FIG. 10, the shapes of the first opening portions 124 are oval shapes, but they may be elliptical shapes, rectangles or the like, and it is sufficient that the shapes have a longer length in the vehicle width direction than a length in the vehicle front-rear direction. Furthermore, in the knee airbag 122 illustrated in FIG. 10, the first opening portions 124 in the middle are oval shapes, but it may be that only the first opening portions 124 at one length direction end portion are oval shapes, and it may be that only the first opening portions 124 at both length direction end portions are oval shapes.

According to the knee airbag 122 with the configuration described above, more gas flows through the oval-shaped first opening portions 124 than through circles. Thus, this is effective if it is desired that a deployment speed of the knee airbag 122 in the vehicle up-down direction should be raised.

Figure 11:
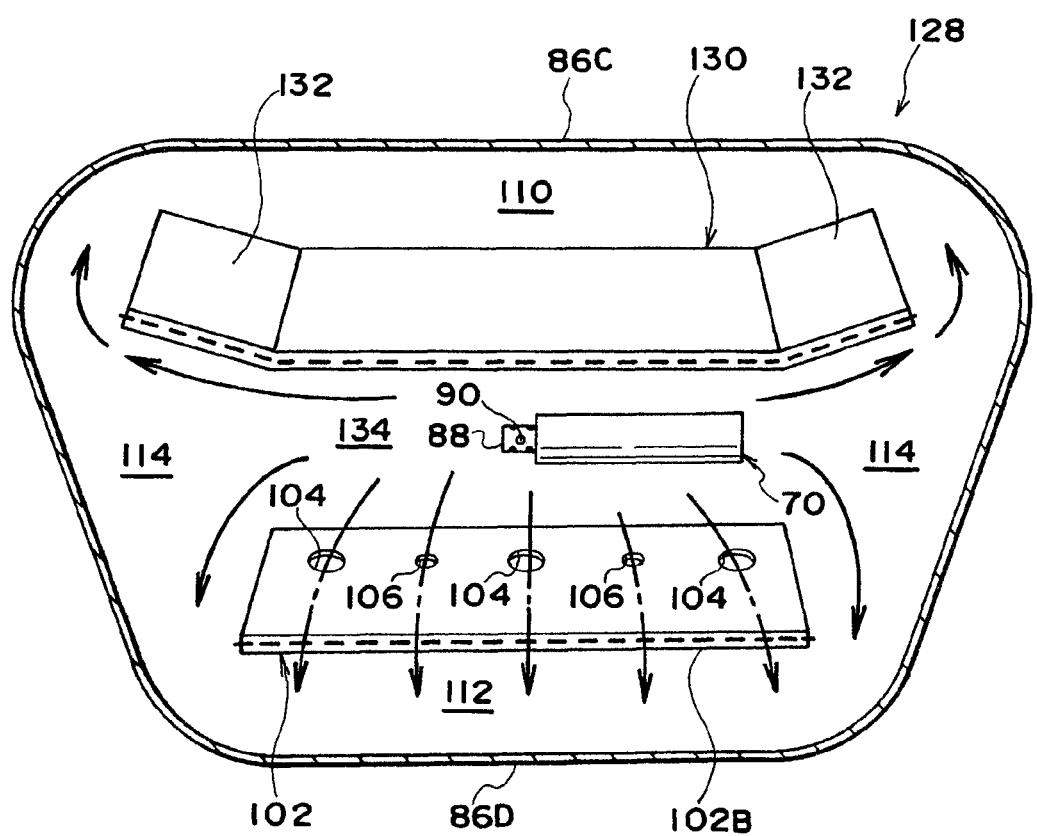
FIG. 11 is a vertical sectional diagram illustrating a knee airbag relating to a third variation.

In a knee airbag 128 illustrated in FIG. 11, both the first opening portions 104 and the second opening portions 106 are formed in the lower tether 102, but neither the first opening portions 104 nor the second opening portions 106 are formed in an upper tether 130. However, this is a configuration in which both length direction end portions of the upper tether 130 are inflected in the vehicle upward direction, and taper portions 132 are applied to the both length direction end portions of the upper tether 130. Note that the taper portions 132 need not necessarily have linear forms and they may have curved shapes.

According to the knee airbag 128 with the configuration described above, the gas emitted from the gas emission portion 88 of the inflator 70 is supplied in the vehicle width direction through a middle flow path 134. In this case, because the taper portions 132 are provided at the two length direction end portions of the upper tether 130, the gas is quickly supplied to the vehicle upward side. Therefore, this is favorable if it is desired that the two end portions of the knee airbag 128 be deployed by inflating as quickly as possible to the vehicle upward side while the whole of the knee airbag 128 is rapidly deployed in the vehicle width direction.

Figure 12:
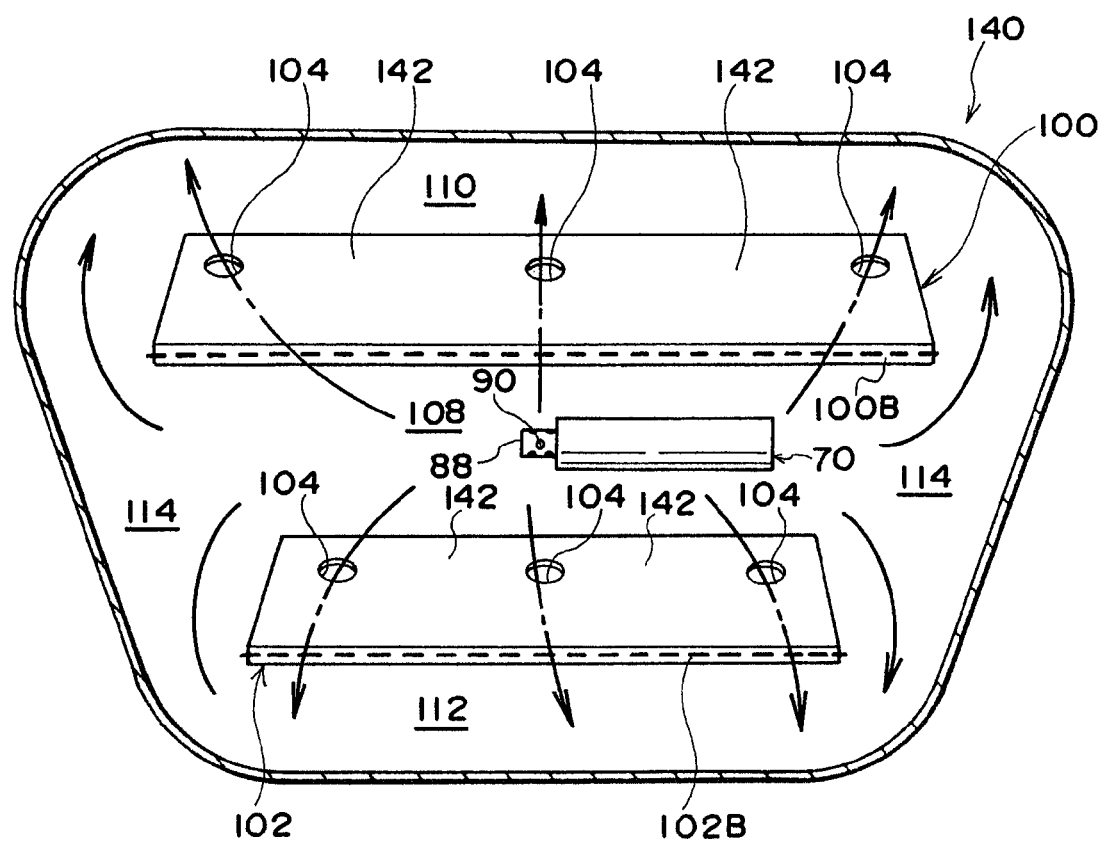
FIG. 12 is a vertical sectional diagram illustrating a knee airbag relating to a fourth variation.

In an airbag 140 illustrated in FIG. 12, non-inflation portions 142 instead of the second opening portions 106 are specified at formation positions of the openings in the upper tether 100 and the lower tether 102. That is, this is a configuration in which the non-inflation portions 142 are specified without opening portions being provided at all at positions coinciding with the knees of an occupant in the vehicle front view. The first opening portions 104 are similarly specified.

According to the airbag 140 with the configuration described above, because the non-inflation portions 142 are specified at portions of the upper tether 100 and the lower tether 102 at which the upper shin portions X of an occupant enter in, the gas does not pass in the vehicle up-down direction through these portions. Therefore, the regions of formation of the non-inflation portions 142 in the knee airbag 86 may be suppressed or prevented from strongly pressing the upper shin portions X of the occupant in the vehicle rearward direction.

Supplementary Descriptions of the Above Exemplary Embodiment

In the exemplary embodiment described above, the glove door incorporated-type knee airbag device 40 is described as operating during a frontal collision, but this is not to be limiting. A collision predictor such as a pre-crash sensor or the like may be installed in the vehicle and a glove door incorporated-type knee airbag device may be operated when a collision is predicted by the collision predictor.

To clarify the term "incorporated" when the glove door incorporated-type knee airbag device 40 relating to the present exemplary embodiment is referred to, it is not required that all the principal structural elements of the knee airbag device be disposed inside the glove door 20. If at least the knee airbag is disposed inside the glove door, this is to be included in the meaning of "incorporated". Therefore, the inflator and airbag as described above may be connected by a connector such as a hose or the like, and the inflator may be provided at the glove box main body 16, or provided at the instrument panel 10, or provided at the body in an inner panel reinforcement or the like, or provided at equipped machinery such as an air-conditioning unit or the like.

In the present exemplary embodiment, for example, the exemplary embodiment illustrated in FIG. 1A and FIG. 1B, all of the first opening portions 104 and the second opening portions 106 are disposed to be offset to the vehicle forward side by the distance δ from the center line P of the thickness direction of the knee airbag 86, but it is sufficient that at least the second opening portions 106 be offset. Therefore, for example, a configuration in which only the central first opening portions 104 and the two second opening portions 106 at both sides thereof are offset to the vehicle forward side from the center line P while the first opening portions 104 at both sides are disposed on the center line P of the thickness direction of the knee airbag 86 is also to be included in the present invention recited in the fifth aspect.

The invention claimed is:

1. A knee airbag device for a vehicle, comprising:
a gas generator that operates to generate gas;
a knee airbag that is accommodated in a folded state and is disposed at a height of knees of an occupant in a sitting state, and that deploys by inflating toward the knees of the occupant with gas supplied from the gas generator;
an upper tether and a lower tether that span between an occupant side base fabric portion and a counter-occupant side base fabric portion of an interior of the knee airbag, and that are disposed along a vehicle width direction at up-down positions sandwiching a gas inflow portion at which the gas from the gas generator inflows; and
a gas through-flow control portion that is provided at the upper tether and the lower tether;
wherein the gas through-flow control portion comprising:
gas through-flow opening portions that are provided at positions offset in the vehicle width direction relative to upper shin portions of the occupant in a vehicle front view, and
upper shin entry allowance portions that are provided at positions coinciding with the upper shin portions in the vehicle front view and that are constituted as small opening portions whose opening area are specified to be smaller than the gas through-flow opening portions, and
a pitch of the adjacent upper shin entry allowance portions of the upper tether is specified to be larger than a pitch of the adjacent upper shin entry allowance portions of the lower tether.

2. The knee airbag device for a vehicle according to claim 1, wherein the gas through-flow opening portions are formed respectively at outer sides of and between the two upper shin entry allowance portions.

3. The knee airbag device for a vehicle according to claim 1, wherein at least the upper shin entry allowance portions of the gas through-flow control portion are disposed to be offset to the vehicle forward side relative to a center line of a thickness direction of the knee airbag.

4. The knee airbag device for a vehicle according to claim 1, wherein the gas generator is disposed at the counter-occupant side base fabric portion side of the interior of the knee airbag, between the upper tether and the lower tether.

5. The knee airbag device for a vehicle according to claim 1, wherein a device main body is installed at a vehicle interior member provided at the vehicle forward side of a passenger seat.

6. The knee airbag device for a vehicle according to claim 5, wherein the vehicle interior member is a glove door provided at an instrument panel.

\* \* \* \* \*